US010747665B2

(12) United States Patent
Mainali et al.

(10) Patent No.: US 10,747,665 B2
(45) Date of Patent: Aug. 18, 2020

(54) COST-BASED GARBAGE COLLECTION SCHEDULING IN A DISTRIBUTED STORAGE ENVIRONMENT

(71) Applicant: MICROSOFT TECHNOLOGY LICENSING, LLC, Redmond, WA (US)

(72) Inventors: Shane Kumar Mainali, Duvall, WA (US); Rushi Srinivas Surla, Kenmore, WA (US); Peter Bodik, Kirkland, WA (US); Ishai Menache, Redmond, WA (US); Yang Lu, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/371,811

(22) Filed: Apr. 1, 2019

(65) Prior Publication Data

US 2019/0227928 A1 Jul. 25, 2019

Related U.S. Application Data

(63) Continuation of application No. 15/640,349, filed on Jun. 30, 2017, now Pat. No. 10,248,562.

(51) Int. Cl.
*G06F 12/00* (2006.01)
*G06F 13/00* (2006.01)
(Continued)

(52) U.S. Cl.
CPC ........... *G06F 12/0253* (2013.01); *G06F 3/06* (2013.01); *G06F 12/0238* (2013.01);
(Continued)

(58) Field of Classification Search
None
See application file for complete search history.

(56) References Cited

U.S. PATENT DOCUMENTS 6,438,573 B1 * 8/2002 Nilsen .................. G06F 8/10
718/100
10,241,716 B2 3/2019 Mainali et al.
(Continued)

OTHER PUBLICATIONS

"Non-Final Office Action Issued in U.S. Appl. No. 16/280,403", dated Sep. 9, 2019, 5 Pages.

*Primary Examiner* — Sean D Rossiter
(74) *Attorney, Agent, or Firm* — Workman Nydegger

(57) ABSTRACT

In an embodiment, a partition cost of one or more of the plurality of partitions and a data block cost for one or more data blocks that may be subjected to a garbage collection operation are determined. The partition cost and the data block cost are combined into an overall reclaim cost by specifying both the partition cost and the data block cost in terms of a computing system latency. A byte constant multiplier that is configured to modify the overall reclaim cost to account for the amount of data objects that may be rewritten during the garbage collection operation may be applied. The one or more partitions and/or one or more data blocks that have the lowest overall reclaim cost while reclaiming an acceptable amount of data block space may be determined and be included in a garbage collection schedule.

20 Claims, 7 Drawing Sheets

(51) Int. Cl.
*G06F 12/02* (2006.01)
*G06F 3/06* (2006.01)
(52) U.S. Cl.
CPC .............. *G06F 2212/1044* (2013.01); *G06F 2212/154* (2013.01); *G06F 2212/7201* (2013.01); *G06F 2212/7205* (2013.01)

(56) References Cited

U.S. PATENT DOCUMENTS

| | | | | |
|---|---|---|---|---|
| 2013/0073796 | A1* | 3/2013 | Maeda | G06F 12/0246 |
| | | | | 711/103 |
| 2014/0189210 | A1* | 7/2014 | Sinclair | G06F 12/0246 |
| | | | | 711/103 |
| 2016/0188247 | A1* | 6/2016 | Garcia-Arellano | G06F 13/28 |
| | | | | 711/173 |
| 2017/0052715 | A1* | 2/2017 | Suzuki | G06F 3/0616 |
| 2017/0091107 | A1* | 3/2017 | Peterson | G06F 12/123 |
| 2017/0351603 | A1* | 12/2017 | Zhang | G06F 12/0246 |
| 2018/0121343 | A1* | 5/2018 | Kim | G06F 11/1048 |
| 2018/0314633 | A1* | 11/2018 | Horie | G06F 12/0269 |
| 2019/0004731 | A1 | 1/2019 | Mainali et al. | |
| 2019/0179565 | A1 | 6/2019 | Mainali et al. | |

\* cited by examiner

700

| BCM Value | Baseline Reclaim | Baseline Rewrite | Cost |
|---|---|---|---|
| 1 | 60 TB | 200 TB | 100 |
| 1 | 30 TB | 160 TB | 95 |
| 1 | 50 TB | 180 TB | 10 |
| 1 | 40 TB | 220 TB | 105 |
| 100 | 70 TB | 200 TB | 110 |
| 100 | 60 TB | 160 TB | 80 |
| 100 | 30 TB | 180 TB | 100 |
| 100 | 50 TB | 220 TB | 90 |

810 — Determining A Reclaim Cost For One Or More Data Blocks Of One Or More Of The Plurality Of Partitions During A Garbage Collection Operation 820 — Determining A Byte Constant Multiplier That Is Configured To Modify The Reclaim Cost To Account For The Amount Of Data Objects That May Be Rewritten During The Garbage Collection Operation 830 — Accessing One Or More Of A Baseline Reclaim Budget And A Baseline Rewrite Budget 840 — Iteratively Varying One Or More Of The Baseline Reclaim Budget, The Baseline Rewrite Budget, And Byte Constant Multiplier To Determine An Effect On The Reclaim Cost 850 — Generating A Schedule For Garbage Collection, The Schedule Including Those Data Blocks That At Least Partially Minimize The Reclaim Cost Based On The Iterative Varying

FIG. 8

COST-BASED GARBAGE COLLECTION SCHEDULING IN A DISTRIBUTED STORAGE ENVIRONMENT

CROSS-REFERENCE TO RELATED APPLICATIONS

This application is a continuation of U.S. patent application Ser. No. 15/640,349 filed on Jun. 30, 2017, entitled "COST-BASED GARBAGE COLLECTION SCHEDULING IN A DISTRIBUTED STORAGE ENVIRONMENT," the entirety of each of which are incorporated herein by reference.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

For instance, cloud computer services that include databases and tables implemented across various computer systems are becoming increasingly popular. Furthermore, cloud databases and tables often include hundreds of thousands, or even millions of databases/tables, each of which may comprise terabytes or more of data. Accordingly, storage efficiency, especially in relation to backups can be crucial in the management of such systems. For instance, many cloud computer services offer subscribers the ability to store particular data within provided tables. As the data is written to and then deleted from the tables, garbage collection operations are often needed so that storage space may be recovered. However, garbage collecting can come at a large cost to the cloud computer services in the form of large, and oftentimes inefficient, uses of resources.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems and methods for scheduling garbage collection in a distributed environment that includes multiple partitions that reference various data blocks that store data objects, the garbage collection scheduling being based on a cost to reclaim one or more of the data blocks for further use. In one embodiment a reclaim cost for one or more data blocks of one or more partitions during a garbage collection operation may be determined. A byte constant multiplier that is configured to modify the reclaim cost to account for the amount of data objects that may be rewritten during the garbage collection operation may be determined. One or more of a baseline reclaim budget and a baseline rewrite budget may be accessed. The baseline reclaim budget may specify an acceptable amount of data blocks that should be reclaimed by the garbage collection operation and the baseline rewrite budget may specify an upper limit on the amount of data objects that may be rewritten during the garbage collection operation. One or more of the baseline reclaim budget, the baseline rewrite budget, and byte constant multiplier may be iteratively varied to determine an effect on the reclaim cost. A schedule for garbage collection may be generated, the schedule including those data blocks that at least partially minimize the reclaim cost based on the iterative varying.

In another embodiment, a partition cost of one or more of the plurality of partitions and a data block cost for one or more data blocks that may be subjected to a garbage collection operation are determined. The partition cost and the data block cost are combined into an overall reclaim cost by specifying both the partition cost and the data block cost in terms of a computing system latency. A byte constant multiplier that is configured to modify the overall reclaim cost to account for the amount of data objects that may be rewritten during the garbage collection operation may be applied. The one or more partitions and/or one or more data blocks that have the lowest overall reclaim cost while reclaiming an acceptable amount of data block space may be determined and be included in a garbage collection schedule.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 7 illustrates an embodiment of the results from varying one or more of a baseline reclaim budget, a baseline rewrite budget, and a byte constant multiplier;

FIG. 8 illustrates a flowchart of a method for scheduling garbage collection in a distributed environment that includes a plurality of partitions that reference a plurality of data blocks that store data objects, the garbage collection scheduling being based on a cost to reclaim one or more of the data blocks for further use.

DETAILED DESCRIPTION

Figure 1:
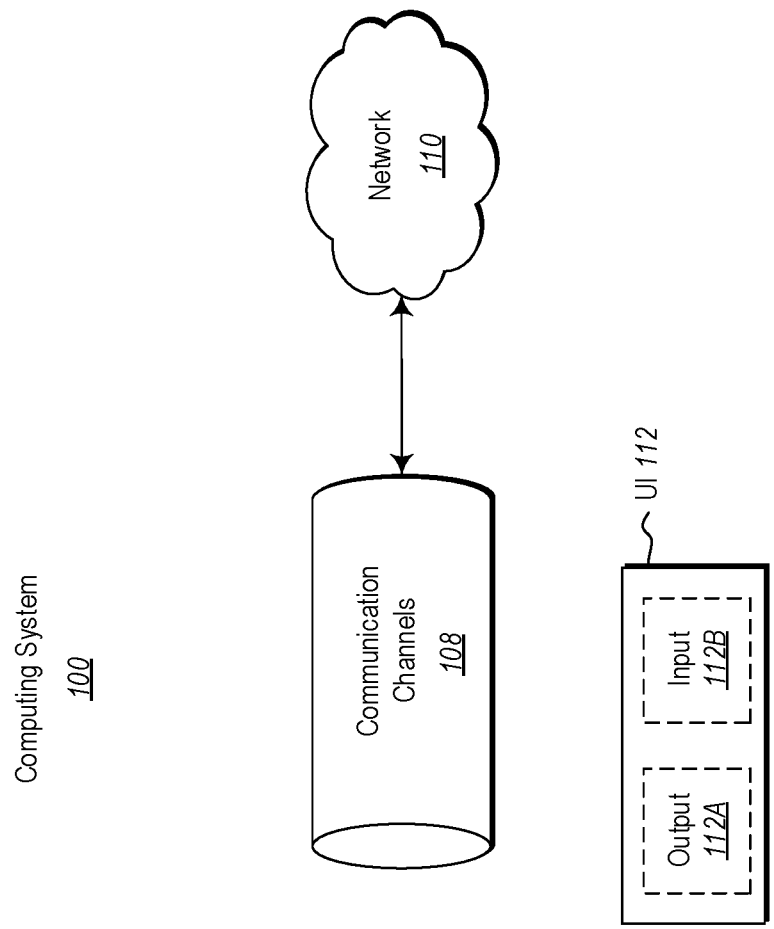
FIG. 1 illustrates an example computer architecture that facilitates operation of the principles described herein.

Embodiments disclosed herein are related to computing systems and methods for scheduling garbage collection in a distributed environment that includes multiple partitions that reference various data blocks that store data objects, the garbage collection scheduling being based on a cost to reclaim one or more of the data blocks for further use. In one embodiment a reclaim cost for one or more data blocks of one or more partitions during a garbage collection operation may be determined. A byte constant multiplier that is configured to modify the reclaim cost to account for the amount of data objects that may be rewritten during the garbage collection operation may be determined. One or more of a baseline reclaim budget and a baseline rewrite budget may be accessed. The baseline reclaim budget may specify an acceptable amount of data blocks that should be reclaimed by the garbage collection operation and the baseline rewrite budget may specify an upper limit on the amount of data objects that may be rewritten during the garbage collection operation. One or more of the baseline reclaim budget, the baseline rewrite budget, and byte constant multiplier may be iteratively varied to determine an effect on the reclaim cost. A schedule for garbage collection may be generated, the schedule including those data blocks that at least partially minimize the reclaim cost based on the iterative varying.

In another embodiment, a partition cost of one or more of the plurality of partitions and a data block cost for one or more data blocks that may be subjected to a garbage collection operation are determined. The partition cost and the data block cost are combined into an overall reclaim cost by specifying both the partition cost and the data block cost in terms of a computing system latency. A byte constant multiplier that is configured to modify the overall reclaim cost to account for the amount of data objects that may be rewritten during the garbage collection operation may be applied. The one or more partitions and/or one or more data blocks that have the lowest overall reclaim cost while reclaiming an acceptable amount of data block space may be determined and be included in a garbage collection schedule.

There are various technical effects and benefits that can be achieved by implementing aspects of the disclosed embodiments. By way of example, it is now possible to determine a reclaim cost for various data blocks that may be subjected to garbage collection. It is further possible to vary various parameters related to the reclaim cost to determine data blocks that minimize reclaim cost while providing an acceptable amount of reclaim. This provides for more efficient garbage collection as system resources are efficiently used. Further, the technical effects related to the disclosed embodiments can also include improved user convenience and efficiency gains.

Some introductory discussion of a computing system will be described with respect to FIG. 1. Then scheduling garbage collection in a distributed environment that includes a plurality of partitions that reference a plurality of data blocks that store data objects will be described with respect to FIGS. 2 through 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
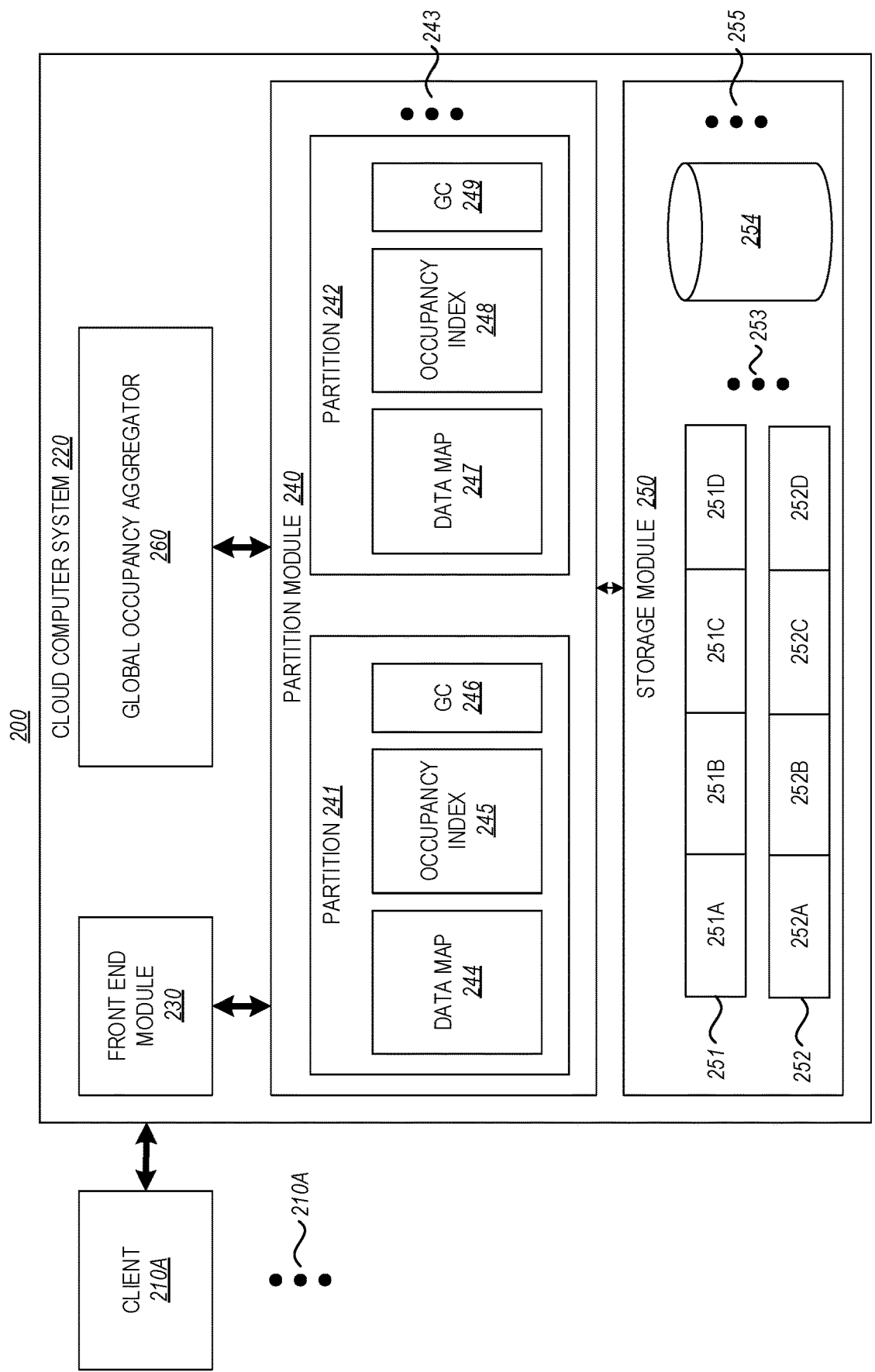
FIG. 2 illustrates an example cloud computer system that allows global scheduling of garbage collection in accordance with the principles described herein.

FIG. 2 illustrates a computer environment 200 for globally scheduling garbage collection in a cloud computing system. As shown, FIG. 2 includes a client computer system 210A and a cloud computer system 220, which each may correspond to the computer system 100, as described with respect to FIG. 1. As such, the client computer system 210A may comprise any type of computer system (e.g., a desktop, laptop, smartphone, tablet, and so forth) running any type of operating system (e.g., MICROSOFT® WINDOWS®, GOOGLE™ CHROME OS™, APPLE® MACOS®, and so forth). Furthermore, the client computer system 210A may comprise any computer system that is capable of communicating with cloud computer system 220. Notably, while only one client computer system 210A is shown in FIG. 2, ellipses 210B represents that any number of client computer systems may be used to practice the principles described herein.

As briefly described, the computer environment 200 includes the cloud computer system 220. The cloud computer system 220 may comprise any type of cloud computer system that allows users to store and/or generate data within the cloud computer system. For instance, the cloud computer system 220 may comprise MICROSOFT AZURE®, AMAZON WEB SERVICES®, GOOGLE CLOUD PLATFORM™, and so forth. Accordingly, while only one cloud computer system 220 is shown for ease of explanation, one of skill in the art will understand that in many embodiments the cloud computer system may comprise any number of distributed computer systems that can singly, or in combination, be used to practice the principles described herein. As illustrated, the cloud computer system 220 includes various modules or engines and/or functional blocks that may be used to perform various operations with respect to data of the cloud computer system, as further described herein. The various engines and/or functional blocks of the cloud computer system 220 may be implemented on a local computer system of the cloud computer system 220 or may be implemented in a distributed fashion across any number of distributed computer systems of the cloud computer system 220. Accordingly, the embodiments disclosed herein are not limited by the number of computer systems that are used to implement the embodiments.

The various modules and/or functional blocks of the cloud computer system 220 may be implemented as software, hardware, or a combination of software and hardware. Notably, the cloud computer system computer system 220 may include more or less than the modules/functional blocks illustrated in FIG. 2. Additionally, some of the modules/functional blocks may be combined as circumstances warrant. Although not illustrated, the various modules/functional blocks of the cloud computer system 220 may access and/or utilize a processor and memory, such as processor 102 and memory 104, as needed to perform their various functions.

As illustrated, the cloud computer system 220 may include a front end module 230. In operation, the front end module 230 may receive requests from the client 210A and/or clients 210B to perform actions such as a read, a write, or a delete of some data objects stored by the cloud computer system 220.

The cloud computer system 220 may also include a partition module 240. As illustrated, the partition module 240 may include a partition 241, a partition 242, and any number of additional partitions as illustrated by the ellipses 243, which in some embodiments may number in the tens of thousands or more. As further illustrated, the partition 241 includes or otherwise has access to a data map 244, an occupancy index 245 and a garbage collector 246. The partition 242 includes or otherwise has to access a data map 247, an occupancy index 248, and a garbage collector 249. Although not illustrated, any of the additional partitions 243 may also include or otherwise has access to a data map, an occupancy index, and a garbage collector. The partition module 240 may receive the requests from the front end module 230 and may direct that the operations specified in the requests be performed. The operation of the various partitions 241-243 will be described in more detail to follow.

The cloud computer system 220 may also include a storage module 250. As illustrated, the storage module 250 may include various data blocks such as data blocks 251, 252, and any number of additional data blocks as illustrated by ellipses 253, which is some embodiments may number in the hundreds of thousands or more. The data blocks may be a fixed size, such as 0.25 to 3 GB, although they may be other sizes as well. The data blocks 251, 252, and 253 may include or store various data objects. For example, the data block 251 may include or store data objects 251A-251D and the data block 252 may include or store data objects 252A-252D. The data objects 251A-251D and/or the data objects 252A-252D may be related to each other such as being portions of a single data object or alternatively, they may be unrelated separate data objects.

The data objects may include any type of reasonable data. For example, in one embodiment, the data objects may be a Binary Large Object (BLOB), such as block blobs, page blobs, or files. In other embodiments, the data objects may be file tables or the like or may be other reasonable data types. Accordingly, the embodiments disclosed herein are not limited by the data type of the implemented data objects. As also illustrated, the storage module 250 includes a storage disk or node 254 and any number of additional storage disks or nodes as illustrated by the ellipses 255. The storage disks or nodes host or support the various data blocks 251, 252, and 253. It will be appreciated that the storage disks 254 and 255 may include numerous storage arrays and may be distributed as circumstances warrant.

Figure 3:
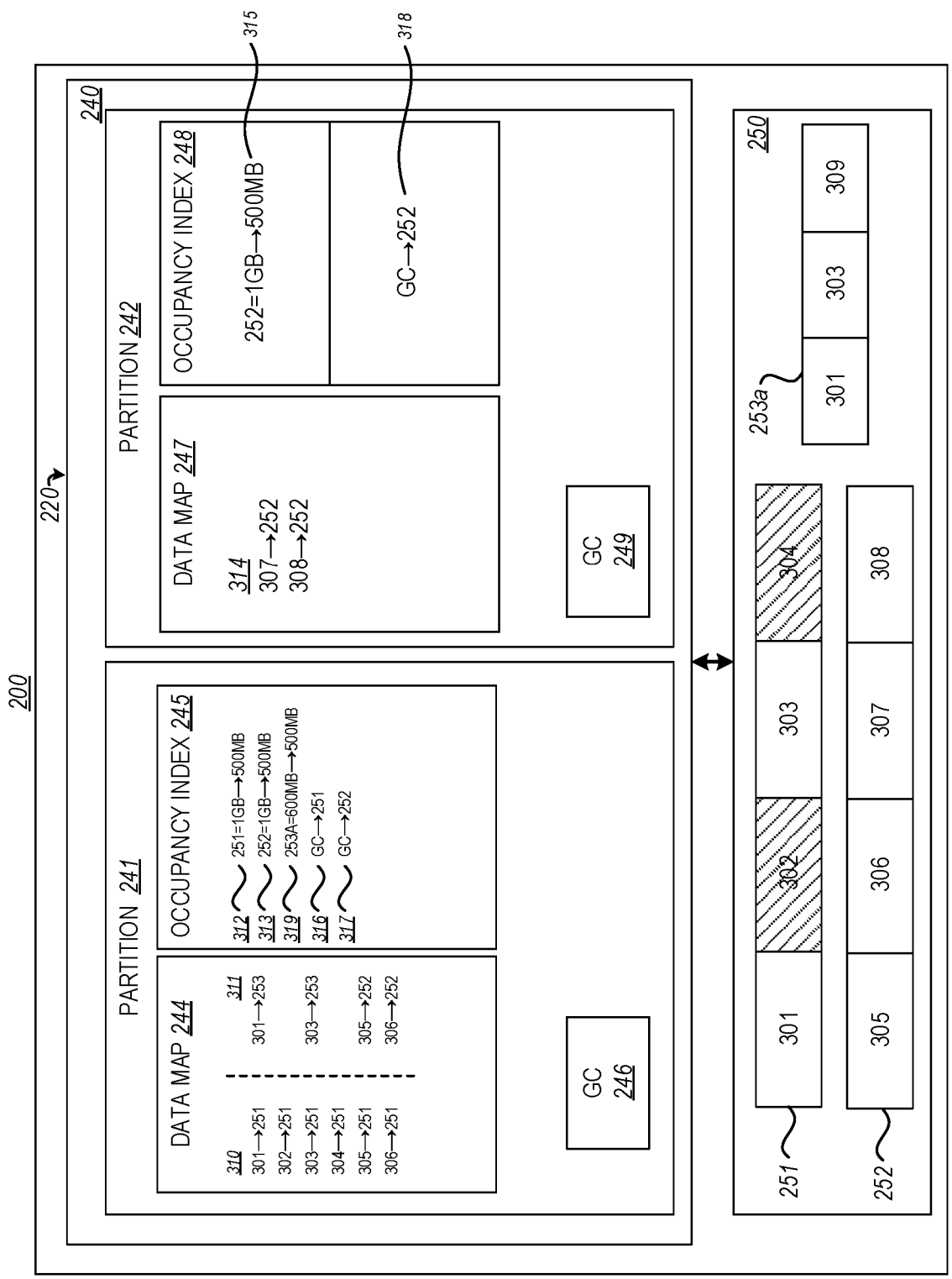
FIG. 3 illustrates an alternative view of the example cloud computer system focusing on the partition module and the storage module.

FIG. 3 illustrates an alternative view of the cloud computer 220 focusing on the partition module 240 and the storage module 250. As shown, the data block 251 includes data objects 301-304, which may correspond to the data objects 251A-251D. The data block 252 includes data objects 305-308, which may correspond to the data objects 252A-252B.

As described previously, the partition 241 may include a data map 244 that points to or references various data blocks and data objects. It will be appreciated that the data blocks discussed herein function as a container for the data objects discussed herein. As illustrated in FIG. 3 at 310, the data map 244 shows a pointer for the data object 301, 302, 303 and 304 to the data block 251 and a pointer for the data objects 305 and 306 to the data block 252. In other words, the data map 244 points to or maps the location of each of the data objects 301-306 in the storage module 250. In like manner, the data map 247 of the partition 242 shows a pointer for the data objects 307 and 308 to the data block 252 as shown at 314. Thus, the data map 247 points to or maps the location of each of the data objects 307-308 in the storage module 250. It will be appreciated that the mapping shown in FIG. 3 is for use in explaining the embodiments disclosed herein and is not meant to imply any specific type of mapping. Accordingly, the embodiments disclosed herein are not limited by any particular type of mapping implemented by the partitions 241-243.

As also previously described, the partition 241 may also include or have access to the occupancy index 245 and the garbage collector 246. In operation, the partition 241 uses the occupancy index 245 to keep track of the occupancy of the data blocks (i.e., data blocks 251 and 252) that include the data objects that are referenced by the partition 241. This information may then be used to schedule the garbage collector 246 to perform garbage collecting. For example, suppose that the data block 251 is 1 GB and further suppose that each of the data objects 301-304 is 250 MB. In operation, the partition 241 may indicate in the occupancy index 245 that the data block 251 is 1 GB and that it is occupied by 1 GB of data objects. In such instance, there may be no need for garbage collection to occur since the data block 251 is being efficiently used. It will be appreciated that the occupancy index 245 may include numerous additional entries besides those shown in FIG. 3.

As further described previously, the partition module 240 may receive a request such as read, write, update or delete from the client 210A or 210B. The partition module 240 may then direct the request to the proper partition based on the mapping of the partition. For, example, suppose that the client 210A sends one or more requests to delete the data objects 302 and 304 that are included in the data block 251. In such case, the requests may be directed to the partition 241 since it includes the key range that maps to the data objects 302 and 304. The partition 241 may direct that the storage module 250 delete the data objects 302 and 304 as shown by the hashed lines in FIG. 3. In some embodiments, such as those that are implemented in an append only system, the delete will be performed by changing the pointers to the data objects so they no longer point or map to the data objects. For example, as shown at 311, the data map 244 may be updated to so that it no longer points to or maps to the data objects 302 and 304.

The partition 241, in one embodiment, may periodically update the occupancy index 245 to reflect changes to the occupancy. For example, the partition 241 may update the occupancy index 245 to reflect that the data objects 302 and 304 have been deleted. As shown at 312, the occupancy index 245 may be updated to reflect that while the data block is 1 GB, it only has 500 MB, the 250 MB of data objects 301 and 303, currently being used. In such case, the partition 241 may, as indicated at 316, schedule the garbage collector 246 to garbage collect the data block 251.

Having the partition 241 update the occupancy index after every request to modify a data block may result in a large use of memory resources and system resources. Accordingly, in an alternative embodiment the storage module 250 may include a partition index (not illustrated) that is modified when there are changes to the data blocks, for example when the data objects 302 and 304 are deleted the pointers in the partition index are modified to no longer point or map to the data objects. Then during the garbage collection operation, the garbage collector 246 may scan the partition index to determine valid data objects. The garbage collector 246 may then update the occupancy index 245 as needed.

In one embodiment, such as in an append only system, the garbage collector 246 may scan the occupancy index 245 and determine that a garbage collection has been scheduled in the manner described. The garbage collector 246 may then rewrite or copy the data objects 301 and 303 to a data block 253A, which is an example of one of the additional data blocks 253, and may cause the pointers in the data map 244 to be updated to reflect this as illustrated at 311. The garbage collector may then inform the storage module 250 that the data block 251 is now available to be used by other partitions to write data objects to. In this manner, the cloud computer system 220 may recover the 500 MB that were no longer being used in the data block 251 and put it to a more efficient use.

In addition, as shown at 319 the partition 241 may update the occupancy index 245 to reflect that the data objects 301 and 303 are now included in the data block 253A. In the illustrated embodiment, the data block 253A is 600 MB and so the occupancy index shows that 500 MB (i.e., 250 MB for each of the data objects 301 and 303) is being used, leaving a 100 MB unused space which is shown at 309. In this case, the partition 241 may not schedule garbage collection of the data block 253A since most of the data block is being used.

In some embodiments a data block may be shared by two or more partitions. That is, two or more partitions may reference data objects that are included or stored in the same data block. This may occur when a single partition is divided by the partition module 240 for load balancing purposes. It may also occur for other reasonable reasons. For example, FIG. 3 shows that the partition 241 and 242 both reference data objects included in the data block 252 as previously discussed. In such embodiments, the partitions 241 and 242 are typically not aware of each other as partitions are independent of each other. Accordingly, each of the partitions may schedule unneeded garbage collecting because they do not know the occupancy of the other partition.

For example, suppose that the data block 252 is 1 GB and further suppose that each of the data objects 305-308 is 250 MB. When the partition 241 updates the occupancy index 245, it may determine, as shown at 313, that while the data block is 1 GB, it only has 500 MB, the 250 MB of data objects 305 and 306, currently being used since it is not aware that the partition 242 is using the other 500 MB. The partition 241 may then schedule, as shown at 317, the garbage collector 246 to perform a garbage collection operation on the data block 252 to recover the supposedly unused disk space.

Likewise, when the partition 242 updates the occupancy index 248, it may determine, as shown at 315, that while the data block is 1 GB, it only has 500 MB, the 250 MB of data objects 307 and 308, currently being used since it is not aware that the partition 241 is using the other 500 MB. As a result, it may also schedule, as shown at 318, the garbage collector 249 to perform a garbage collection operation on the data block 252 to recover the supposedly unused disk space. It will be appreciated that the occupancy index 248 may include numerous additional entries besides those shown in FIG. 3.

As will be appreciated, having both the garbage collectors 246 and 249 attempt to perform the unneeded garbage collection operations is a waste of system resources as it does not result in any disk space recovery for the system to use. For example, in an append only system, when doing garbage collection, the garbage collector 246 may rewrite the data objects 305 and 306 to an unused one of the data blocks 253 and the garbage collector 249 may rewrite the data objects to a different unused one of the data blocks 253. Performing both of the data rewrites may use system resources such as processing resources, system I/O resources, and system bandwidth without resulting in any real disk space recovery. Advantageously, the embodiments disclosed herein provide for a global occupancy aggregator module or engine that is able to perform global scheduling of the various garbage collection operations to thereby ensure efficient garbage collection by the various partitions of the cloud computer 220.

Returning to FIG. 2, it shown that the cloud computer system 220 includes the global occupancy aggregator 260. Although the global occupancy aggregator 260 is shown as being a separate module or functional block, this is for ease of explanation only. In some embodiments, the global occupancy aggregator 260 may be part of the partition module 240 or the storage module 250. In other embodiments, the global occupancy aggregator 260 may be distributed across various modules as circumstances warrant.

In operation, the global occupancy aggregator 260 may be able to access the occupancy indexes of the partitions 241-243 (i.e., occupancy index 245, occupancy index 248 and the non-illustrated occupancy indexes of the various partitions 243) to generate a global occupancy index. The global occupancy aggregator 260 may then use the global occupancy information to determine which partitions and data blocks to schedule garbage collection for. The global garbage collection schedule may then be fed to the various garbage collectors, which will then follow the global schedule instead of any garbage collection schedule that may be implemented locally by the partitions. In some embodiments, the operation of the global occupancy aggregator 260 is set to run at regular intervals, such as once per hour, although other reasonable intervals may also be implemented, to ensure continuous global garbage collection scheduling without putting an undue burden on system resources. The operation of the global occupancy aggregator 260 will be now be explained in more detail.

Figure 4:
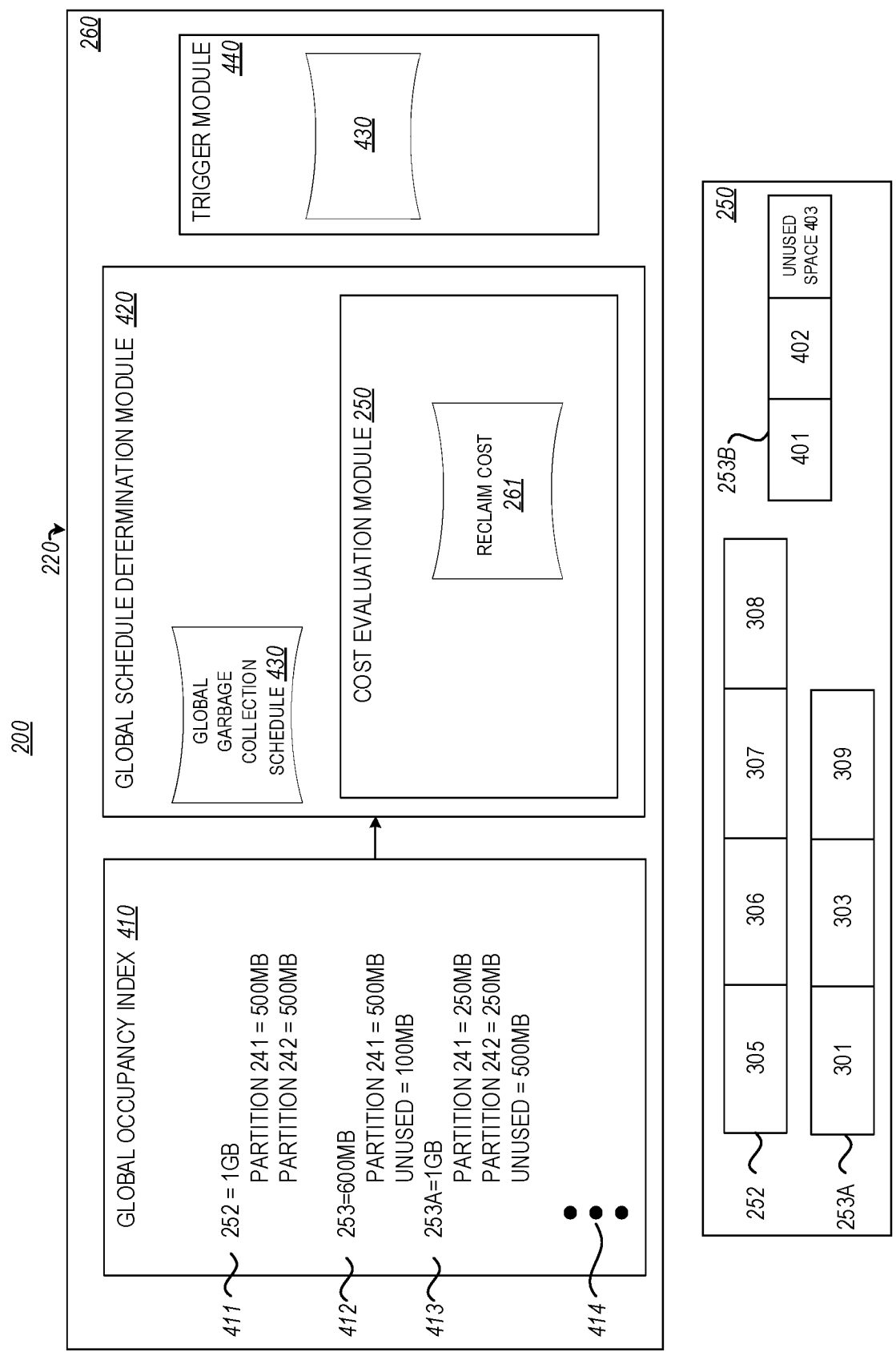
FIG. 4 illustrates a further alternative view of the example cloud computer system focusing on the storage module and the global occupancy aggregator.

FIG. 4 illustrates an alternative view of the cloud computer 220 focusing on the storage module 250 and the global occupancy aggregator 260. As shown, the global occupancy aggregator 260 may include or otherwise have access to a global occupancy index 410. The global occupancy aggregator 260 may access the occupancy indexes of the partitions 241-243 to generate the global occupancy index 410. In some embodiments, the global occupancy aggregator 260 may query the partitions for their respective occupancy indexes while in other embodiments the partitions may send the occupancy index information to the global occupancy aggregator 260 at certain intervals or in response to certain triggers. Other embodiments may combine both of these actions.

For example, the global occupancy aggregator 260 may access the occupancy index 245 of partition 241 and the occupancy index 248 of partition 242. As mentioned previously, the occupancy indexes 245 and 248 show the data block 252 as only having 500 MB of its 1 GB being used. However, the global occupancy aggregator 260 may aggregate the occupancies of the data block 252 to determine that the entire 1 GB is being used. As shown at 411, this may be entered into the global occupancy index, where it shows 500 MB being used by partition 241 and 500 MB being used by partition 242.

The global occupancy index 410 may also include additional occupancy information obtained from the various partitions 241-243. As shown in FIG. 4 at 412, the occupancy information 319 of the data block 253A is included in the global occupancy index 410. Since the data block 253A is 600 MB and the data objects 301 and 303 are 250 MB, the global occupancy index 410 shows that 500 MB of the data block is being used by the partition 241 and 100 MB is the unused space 309.

FIG. 4 shows a data block 253B, which is an example of the additional data blocks 253. The data block 253 includes a data object 401 and 402 and an unused space 403. Suppose that the data block 253B is 1G and that data objects 401 and 402 are each 250 MB. Although not illustrated in FIG. 3, suppose that data object 401 is included in partition 241 and thus is included in data map 244 and occupancy index 245 and suppose that that data object 402 is included in partition 242 and thus is included in data map 247 and occupancy index 248. As shown at 413, the global occupancy index may show the occupancy of the data block 253B as 250 MB being by partition 241, 250 MB being used by partition 242, and 500 MB as being unused space 403.

For ease of explanation, this disclosure has only discussed the global occupancy aggregator 260 accessing the occupancy information for the partitions 241 and 242 and recording this information in the global occupancy index 410. However, it will be noted that in most implementations, there may be tens of thousands of the additional partitions 243, each having hundreds of thousands or more data blocks, that will also be accessed by the global occupancy aggregator 260 to obtain their local occupancy information. This occupancy information will then be recorded in the global occupancy index 410 as illustrated by the ellipses 414.

The global occupancy aggregator 260 may also include or otherwise have access to a global schedule determination module 420. In operation, the global schedule determination module 420 may determine a global garbage collection schedule 430 that may be used by the various garbage collectors of each partition based on a cost analysis of performing the garbage collection. As will be explained in more detail to follow, the global schedule determination module 420 may determine those data blocks 251-253 and partitions 241-243 that will result in the most reclaim of the data blocks at the lowest cost. The global garbage collection schedule 430 may then list those data blocks 251-253 and the partitions 241-243 in the global garbage collection schedule 430.

As shown in FIG. 4 the global schedule determination module 420 may include a cost evaluation module 450 that in operation is configured to determine a reclaim cost 261 for reclaiming the data blocks 251-253 during the garbage collection. That is, the cost evaluation module 250 is able to determine a value/cost ratio for each of the data blocks, where the value is the amount of data block space that is reclaimed during the garbage collection and the cost is the reclaim cost in system resources and the like to reclaim the data block space. The cost evaluation module 450 may maximize the value (i.e., the amount of reclaimed space) while minimizing the reclaim cost in the manner that will now be explained.

In some embodiments, the reclaim cost 261 may include a partition cost that specifies the system resource cost for each partition to generate the local occupancy indexes (i.e., occupancy indexes 245 and 248). The reclaim cost 261 may also include a data block cost that specifies the system resource cost for rewriting or copying the data objects from one data block to another data block during the garbage collection.

Figure 5:
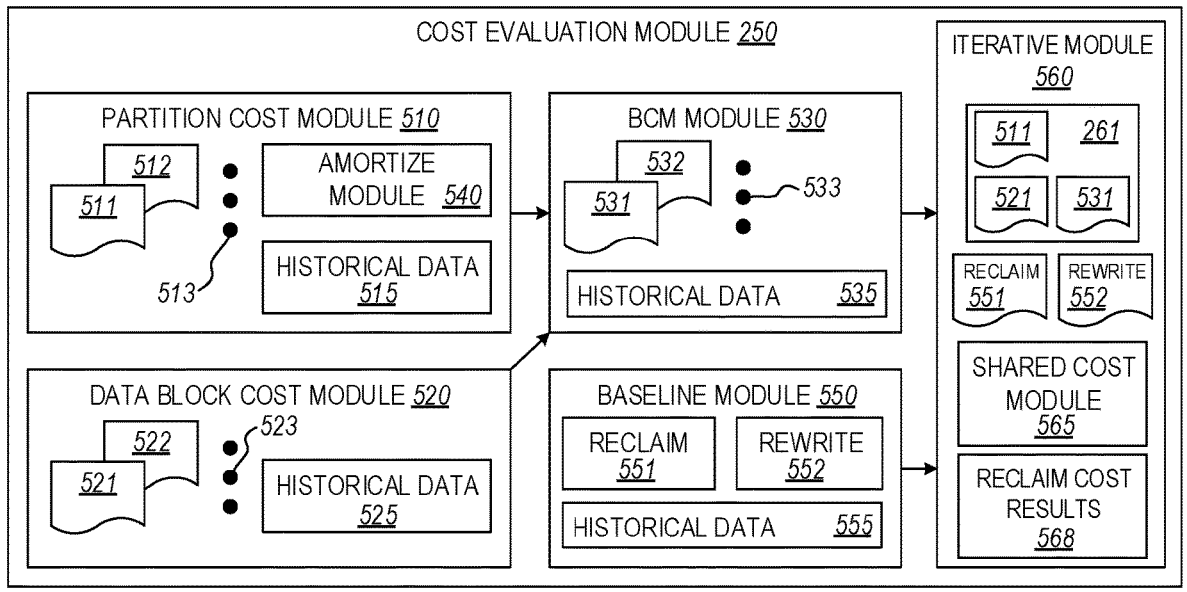
FIG. 5 illustrates an embodiment of a cost evaluation module.

FIG. 5 illustrates an embodiment of the cost evaluation module 450. As illustrated in FIG. 5, the cost evaluation module 450 may include a partition cost module 510 that in operation is configured to determine a partition cost for each of the partitions 241-243. As previously explained, while updating the occupancy index 245, the partition 241 scans over all the data blocks 251-253 for which it maps to. For each data block, the partition 241 computes the amount of data objects that are stored in that data block. For example, as previously described the partition 241 may compute that the data block 251 has 500 MB of data objects and the data block 252 has 500 MB of data objects. A like operation is also performed by the partition 242. In other words, each partition scans over all of its data blocks and for each data block computes the amount of data objects stored in the data block. This becomes the local occupancy shown in the local occupancy indexes.

In one embodiment, when scanning all the data blocks to update the occupancy index 245, the partition 241 may load metadata about each of the data objects stored in the data blocks to determine the amount of data objects that are stored. That is, the partition 241 does not need to load the entire data object, but only needs to load metadata about each data object as this is sufficient to determine the amount of data objects stored in the data blocks. Accordingly, the partition cost for each partition may be specified as a number of IOs needed to read the metadata and a time that is required for the IOs to be read. For example, in one embodiment each IO may be 1 kB in size. In one embodiment, the number of IOs is based on a number of rows of each data block in a given partition or NRows[p], where [p] denotes the partition (i.e., partition 241) the data blocks belong to. The size or the amount of data transferred would be NRows[p]*the size of each TO, which is usually specified a number of bytes. For example, the in the embodiment where each IO was 1 kB, the size would be NRows[p]*1 kB to account for the actual size of the metadata being transferred.

The time that is needed to read the IOs will be based on the number of the IOs. For example, a data block that includes 100 million BLOBs may take longer to read than a data block having a smaller number of BLOBs. This time may be referred to as a seekTime. In some embodiments, the seekTime for a given data block may be based on historical data 515 that includes data from past partition cost determinations. For instance, the historical data 515 may specify that a data block having 100 million BLOBs may take 10 ms per IO to read all the IOs of metadata. The IO sizes may also be included in the historical data 515. In this way, the partition cost module 510 is able to have access to various IO sizes and seekTimes that can be used in determining the partition cost for each partition.

The partition cost module 510 may determine a partition cost for each partition 241-243. As may be appreciated, the number of IOs and the total amount of data transferred are typically specified in different units. Accordingly, in some embodiments, a simple disk model with a specific seek time and bandwidth, which may be based on the historical data 515, is used to estimate a total latency the system would take to service nIOs and transfer nB bytes as a way to combine these units into a single metric when calculating the partition cost according to the following equation:

$$nIO * seekTime + nB/bandwidth \quad \text{equation 1}$$

where nIO is the number of IOs, the seekTime is the time in ms needed to read each of the IOs, nB is the total data transferred, and the bandwidth is the bandwidth of the cloud computer system 220, usually specified in MB/second. Thus, in the embodiment, nIO would be NRows[p], nB would be NRows[p]*1 kB, the seektime would be 10 ms, and the bandwidth would be the bandwidth of the cloud computer system 220.

As shown in FIG. 5, the partition cost module 510 may determine a partition cost 511 for the partition 241, a partition cost 512 for the partition 242, and a partition cost represented by the ellipses 513 that represents a partition cost for all of the partitions 423. The partition costs 511-513 may be examples of a portion of a reclaim cost for reclaiming the data blocks 251-253 during the garbage collection.

The cost evaluation module 450 may also include a data block cost module 520 that in operation is configured to determine the reclaim cost for rewriting or copying data objects from one data block to another data block during the garbage collection. For example, the data block cost would specify the reclaim cost of rewriting the data objects 301 and 303 from the data block 251 to the data block 253a during garbage collection as previously described. The data block cost may be specified as the number of bytes of data that is transferred from one data block to another data block and as number of IOs read during the transfer process. In one embodiment, the number of rows for each data block may be estimated as nR[p,e]=LocalOccupancy[p,e]/AverageDataObjectSize[p] and thus the number of IOs may be determined as 2*nR[p,e], where [p,e] denotes a partition and data block pair. In addition, the total amount of data to be transferred may be 2*LocalOccupancy[p,e], which is typically specified in as a number of bytes.

As with the partition cost, the number of IOs and the total amount of data transferred are typically specified in different units. Accordingly, in some embodiments, the simple disk model with a specific seek time and bandwidth, which may be based on the historical data 525, is used to estimate a total latency the system would take to service nIOs and transfer nB bytes as a way to combine these units into a single metric when calculating the data block cost. For example, the historical data 525 may specify the bandwidth of the cloud computer system 220 while transferring data from one data block to another data block and seektime.

The data block cost module 520 may determine a data block cost for each of the data block selected for garbage collection according by also using equation 1:

$$nIO * seekTime + nB/bandwidth \quad \text{equation 1}$$

where nIO is the number of IOs, the seekTime is the time in ms needed to read each of the IOs, nB is the number of bytes of data transferred from one data block to another data block and bandwidth is the bandwidth of the cloud computer system 220, usually specified in MB/second. In the embodiment, nIO is 2*nR[p,e], nB is 2*LocalOccupancy[p,e], the seektime would be 10 ms, and the bandwidth would be the the bandwidth of the cloud computer system 220.

As shown in FIG. 5, the data block cost module 520 may determine a data block cost 521, a data block cost 522, and any number of additional data block costs represented by the ellipses 523 for those data blocks 251-253 that may be subjected to garbage collection. The data block costs 521-523 may be examples of a portion of a reclaim cost for reclaiming the data blocks 251-253 during the garbage collection.

As may be appreciated, when two partitions share a data block that is scheduled for garbage collection, they may not perform the garbage collection at the same time. For example, suppose that data block 252 is subjected to garbage collection. As described above, this would result in the garbage collector 246 rewriting the data blocks 305 and 306 to a new data block and the garbage collector 249 rewriting the data blocks 307 and 308 to a different new data block. Further suppose that the garbage collector 246 performed its rewrites first, but that the garbage collector 249 did not perform it garbage collection until several hours later. In such case, the data objects 305 and 306 would remain as part of the data block 252 and the new data block during the time period before the garbage collector 249 performed its garbage collection since data block 252 may not be recovered until garbage collector 249 has finished its garbage collection. This may result in a temporary increase in the amount of disk space being used until the data block 252 was recovered. As may be appreciated, if such an occurrence happened to a large number of partitions at once, there may be a chance that the cloud computer system 220 could run out of memory resources for writing new data objects.

Accordingly, the cost evaluation module 450 may include a byte cost multiplier module 530 that in operation is configured to generate a various byte cost multipliers (BCM) 531, 532, and any number of additional BCMs as illustrated by the ellipses 533. The BCMs 531-533 are a constant that is used to take into the account the additional disk space that data objects transferred from one data block to another may take up for a time during garbage collection as described above. In some embodiments, the BCM value may be determined on historical data 535 that specifies past used BCM values.

To account for the rewrites, the BCM value is also used, which modifies the data block cost determined by equation 1 for the data block costs. Accordingly, the data block cost may be characterized by the following equation:

$$nIO * seekTime + BCM * nB / bandwidth \quad \text{equation 2}$$

Accordingly, the partition cost, the data block cost, and the BCM may all be used to determine the value/reclaim cost for the various data blocks. In other words, the value over reclaim cost may be determined as value/partition cost+data block cost*BCM, where the value is the amount of data block space reclaimed, the partition cost is determined by equation 1 as discussed above and the data block cost*BCM is determined by equation 2.

The cost evaluation module 250 may also include a baseline module 550 that in operation is configured to access a baseline reclaim budget or value 551 and/or a baseline rewrite budget or value 552. The baseline reclaim budget 551 may specify a desired amount of data block space that should be reclaimed by the garbage collection. The baseline rewrite budget 552 may specify an upper limit for the total amount of rewrites that may occur during a round of garbage collecting so as to help ensure that only a reasonable amount of disk space is used during garbage collection due to the lag in reclaiming a data block described above. In one embodiment, the baseline rewrite budget 552 may be 200 TB. One or both of the baseline reclaim budget 551 and the baseline rewrite budget 552 may be used to determine the reclaim cost as will be explained. In some embodiments, both of the baseline budgets may be based on a historical data that is stored as part of historical data 555 or may be input by a user of the cloud computer system 220.

The cost evaluation module 250 may also include an iterative module 560 that in operation is configured to iteratively vary one or more of the baseline reclaim budget, the baseline rewrite budget, and BCM to determine an effect on the reclaim cost during the garbage collection for each of the one or more data blocks. As shown, the iterative module 560 may include the reclaim cost 261. The reclaim cost may include a partition cost, a data block cost, and a BCM value, which may be combined into a single reclaim cost by the equation 2 that is based on system latency. In the illustrated embodiment, the reclaim cost 261 includes the partition cost 511, the data block cost 521, and the BCM 531. The baseline reclaim budget 551 and/or the baseline rewrite budget 552 may also be accessed or received by the iterative module 560.

As mentioned above, in some instances a data block may be shared by two or more partitions. For example, the data block 252 is shared by both the partition 241 and 242. In such cases, the data block will only be recovered if the iterative module 560 determines that all of the partitions should perform garbage collection on the data block. Naturally, such shared data block may be viewed as less attractive, since it is not known if all the partitions will be chosen for garbage collection. For example, the partition cost of partition 241 may be much higher than the partition cost of partition 242 and so while partition 242 may be selected for garbage collection, the partition 241 may not be, which will result in the data block 252 not being reclaimed. In addition, the reclaim value (amount of free space) that is obtained from reclaiming the data block 252 is only given once and thus needs to be shared by all the partitions using the data block.

Accordingly, the iterative module 560 may include a shared cost module 565 that in operation is configured to account for the shared data block. In other words, the shared cost module ensures that the cost of the sharing is accounted for in the cost information 261. In one embodiment, the shared cost module 565 divides the reclaim value by the number of partitions sharing a data block to account for the cost of sharing the data block. In this way, the cost of sharing is borne by all of the partitions that share the data block.

Said another way, to account for the cost of sharing, the value/reclaim cost ratio for each data block and partition pair (e, p) is divided by the number of partitions sharing the data block. In one embodiment, the number of partitions sharing a data block is denoted by $|p(e)|$. As mentioned above, any value (i.e., reclaimed space) obtained from the shared is only given once and therefore needs to be discounted to account for being shared. Accordingly, in the embodiment, the value/reclaim cost ratio for each data block and partition pair (e, p) is divided by $|p(e)|^2$. It will be appreciated that the use of $|p(e)|^2$ as a discount term for sharing is only one possible example of a discount term that could be used. For example, in some embodiments $|p(e)|$ may be used as the discount term. Thus, the embodiments disclosed herein are not limited to any one discount cost Accordingly, in one embodiment the value/reclaim cost ratio for each data block and partition pair (e, p) may be denoted as $$\frac{v(e)}{ECT(e, p) * |p(e)|^2},$$

which may be referred to an the index value of the I(e, p) pair, where v(e) is the value (i.e., the reclaimed data block space), ECT is the data block cost as determined by equation 2 discussed previously, and $|p(e)|^2$ is the discount term that accounts for sharing.

It will be noted that the partition cost is only paid once at the time the scan is made by each partition to generate or update the local occupancy. However, the information gained by the scan relates to all of the data blocks in the partition. Thus, this cost needs to be amortized across the data blocks to be properly accounted for. That is, since this cost is totally paid regardless of the number of data blocks that are ultimately reclaimed, the partition cost should be shared by at least some of the data blocks so that the overall reclaim cost for the data blocks is accurate. As may appreciated, if the partition cost is not amortized, then the reclaim cost determined by some data blocks may be too low. Accordingly, in some embodiments the partition cost module 250 may include or have access to an amortize module 540. In operation, the amortize module 540 is able to amortize the partition cost across the data blocks of a partition that may be subjected to garbage collection so that the amortized cost in included in the partition cost 511-513 of each partition.

In one embodiment the amortize module 540 may perform the amortization in the following manner. For each partition p (i.e., partitions 241-243), consider the data blocks ordered in decreasing index value according to the index value discussed previously. Let e(i) be the i-th data block in this order. Then for each data block i such that $$I(e(i), p) > \frac{\sum_{j=1}^{i} v(e(j))}{pC[p] + \sum_{j=1}^{i} ECT(e(j), p) * |p(e(j))|^2},$$

the amortization module 540 may set $$I(e(i), p) := \frac{\sum_{j=1}^{i} v(e(j))}{pC[p] + \sum_{j=1}^{i} ECT(e(j), p) * |p(e(j))|^2}.$$

As discussed above, v(e) is the value (i.e., the reclaimed data block space), ECT is the data block cost as determined by equation 2 discussed previously, |p(e)|² is the discount term that accounts for sharing and pC[p] is the partition cost as determined by equation 1 discussed above. As also mentioned previously, |p(e)|² is only one possible example of a discount term that accounts for sharing.

Figure 6:
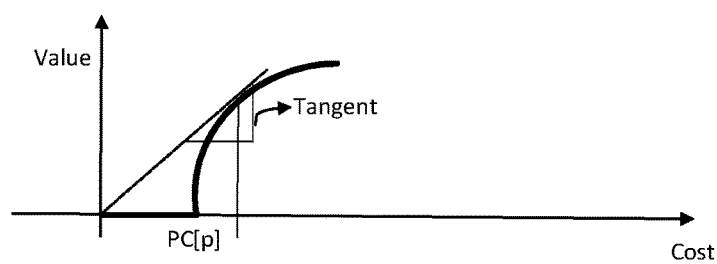
FIG. 6 illustrates a picture view of amortizing a partition cost.

Pictorially, the amortize module 540 may set the index of these partition and data block pairs to be equivalent to the tangent of the cumulative value vs. cumulative cost curve as shown in FIG. 6. As shown in FIG. 6, the solid line shows show the partition cost would be borne if there was no amortization. As shown, the partition cost would be borne by only a few of the partition and data block pair. However, by amortizing the partition cost over all the partition and data block pairs, the cost is shared by the various partition and data block pairs as illustrated by the dashed tangent line. In this way, the partition cost is amortized in a way that it is properly accounted for in the reclaim cost of each data block. This amortized cost may be reflected in the partition costs 511-513.

As mentioned above, the iterative module 560 may iteratively vary one or more of the BCM 531, the reclaim threshold 551 and the rewrite threshold 552 in order to determine an effect on the reclaim cost for each data block in relation to an amount of disk space (i.e., the amount of data bytes) that would that would be reclaimed for that cost. In other words, given the constraints of the baseline reclaim budget and/or the baseline rewrite budget, the iterative module 260 attempts to find those data blocks that may be reclaimed so as to achieve a result similar to the baseline budgets but that would cost the least in terms of the use of cloud computing system 220 resources. Varying one or more of the BCM 531, the reclaim threshold 551 and the rewrite threshold 552 allows the iterative module 260 to determine such data blocks.

The results of iteratively varying the one or more of the BCM 531, the reclaim threshold 551 and the rewrite threshold 552 are collected by the iterative module 260 as reclaim cost results 568. The iterative module 260 is then able to use the reclaim cost results 568 to determine the data blocks 251-253 and their accompanying partitions 241-243 that should be included in the global garbage collection schedule 430.

FIG. 7 shows an example embodiment 700 of the reclaim cost results 568 for a given one of the partitions and its data blocks, for example partition 241 or 242. It will be noted that the embodiment 700 is for use in explanation only and thus the results shown are not intended to limit the embodiments disclosed herein. As shown in FIG. 7, the embodiment 700 includes BCM values 701, baseline reclaim budget 702, baseline rewrite 703, and reclaim cost 704. In the embodiment, the BCM value and the baseline rewrite budget are varied to determine the effect of the varying on the reclaim costs. In this way, it may be determined if changing these values is able to determine a reclaim cost that is lower than a reclaim cost based on the baseline budgets, but that also reclaims an acceptable amount of data block space.

As shown in row 710, a first iteration may include a BCM of 1, a baseline reclaim budget of 60 TB, a baseline rewrite budget of 200 TB and a cost of 100. In the embodiment, the row 710 may be considered a baseline result in that these results are acceptable and should be obtained by the system as a fall back if the process of iteratively varying does not achieve a better result. Thus, the reclaim cost of row 710 may be considered a reclaim cost based on the baseline budgets.

At rows 720-740, the BCM value is kept constant, but the baseline rewrite budget is varied, in this case going to 160 TB, 180 TB, and 220 TB. As is shown, the reclaim cost and baseline reclaim budget showing the amount of reclaimed space change as the baseline rewrite budget changes as these values are varied. In other words, there is an effect on the baseline reclaim cost and the baseline reclaim budget.

At rows 750-780, the BCM value is changed to 100 and the baseline rewrite budget is again varied, in this case going to 160 TB, 180 TB, and 220 TB. As is shown, the reclaim cost and baseline reclaim budget showing the amount of reclaimed space change as the baseline rewrite budget changes as these values are varied. Again, this shows an effect on the baseline cost and baseline reclaim budget by varying the BCM and baseline rewrite cost.

As will be appreciated, the embodiment 700 is a very small sample of an actual reclaim cost result. In practice, the reclaim cost result 568 will include numerous results as represented by the ellipses 790 as the iterative process is performed for numerous BCM values, baseline rewrite budgets, and/or baseline reclaim budgets for multiple partitions and their respective data blocks.

As explained, the iterative module 260 is able to use the reclaim cost results to determine the partitions and data blocks to include in the global garbage collection schedule 430. The included data blocks will be those minimize the reclaim costs while still ensuring that a sufficient amount of data block space is reclaimed. For example, in the embodiment of FIG. 7 some of the iterations caused the cost to go down, but only provided an amount of reclaim that is less than the baseline budget. In such case, the iterative module 260 may determine if this is acceptable. For instance, in row 730 the cost was reduced from 100 to 10 while still providing 50 TB of reclaim space, which is close to 60 TB. In such case since the cost is much lower for a close amount of reclaim space, the iterative module 260 may select the combination of data blocks that would achieve this result.

Alternatively, if it were important to achieve at least 60 TB of reclaim space, the iterative module 260 may select the combination of data blocks that result in row 760, where 60 TB of reclaim is achieved at a cost of 80 or the iterative module 260 may select the combination of data blocks that result in row 750, where 70 TB of reclaim is achieved at a cost of 105, which is only slightly higher than the cost of the baseline configuration. Accordingly, the iterative module 260, by varying the various values as explained to determine the effect on the reclaim cost, is able to determine the combination of BCM value, baseline rewrite budget, and/or baseline reclaim budget that may result in an acceptable amount of data block reclaim at the lowest possible system resource cost.

Based on the reclaim cost determination just described, the global schedule determination module 420 may generate the global garbage collection schedule 430. That is, the global schedule determination module 420 may include in the global garbage collection schedule 430 those partitions and data blocks that would result in an acceptable amount of data block reclaim at the lowest possible system resource cost when subjected to garbage collection.

The global occupancy aggregator 260 may also include or otherwise have access to a trigger module 440. As illustrated, the trigger module 440 may receive the global garbage collection schedule 430 from the global schedule determination module 420. In operation, the trigger module 440 may provide the global garbage collection schedule 430 to the various garbage collectors such as garbage collector 246 and 249. The garbage collectors may then perform the garbage collection specified in the global garbage collection schedule 430. This garbage collection may be according to any reasonable garbage collection such as the garbage collection previously described in relation to FIG. 2.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 8 illustrates a flow chart of an example method 800 for scheduling garbage collection in a distributed environment that includes a plurality of partitions that reference a plurality of data blocks that store data objects, the garbage collection scheduling being based on a cost to reclaim one or more of the data blocks for further use. The method 800 will be described with respect to one or more of FIGS. 2-7 discussed previously.

The method 800 includes determining a reclaim cost for one or more data blocks of one or more of the plurality of partitions during a garbage collection operation (act 810). For example, as previously discussed the cost evaluation module 250 may determine a reclaim cost 261. In one embodiment, the reclaim cost 261 may include a partition cost such as partition cost 511 and a data block cost such as data block cost 521 that are combined into a single value in terms of a computing system latency according to equation 1.

The method 800 includes determining a byte constant multiplier that is configured to modify the reclaim cost to account for the amount of data objects that may be rewritten during the garbage collection operation (act 820). For example, as previously discussed the cost evaluation module 250 may determine a BCM value such as BCM value 530. The BCM value may be used to modify the reclaim cost 261 according to equation 2 to account of the amount of data that may be rewritten during garbage collection.

The method 800 includes accessing one or more of a baseline reclaim budget and a baseline rewrite budget (act 830). The baseline reclaim budget may specify an acceptable amount of data blocks that should be reclaimed by the garbage collection operation and the baseline rewrite budget may specify upper limit on the amount of data objects that may be rewritten during the garbage collection operation. For example as previously described the cost evaluation module 250 may access or receive the baseline reclaim budget 551 and the baseline rewrite budget 552.

The method 800 includes iteratively varying one or more of the baseline reclaim budget, the baseline rewrite budget, and byte constant multiplier to determine an effect on the reclaim cost (act 840). For example, as previously described, particularly in relation to FIG. 7, one or more of the baseline reclaim budget 551, the baseline rewrite budget 552, and the BCM 531 may be varied to determine an effect on a reclaim cost that is based on the baseline budgets and BCM values.

The method 800 includes generating a schedule for garbage collection, the schedule including those data blocks that at least partially minimize the reclaim cost based on the iterative varying (act 850). For example, as previously discussed the data blocks 251-252 and the partitions 241-243 that minimize the reclaim cost while still providing an acceptable amount of reclaim may be included in the global garbage collection schedule 430.

Figure 9:
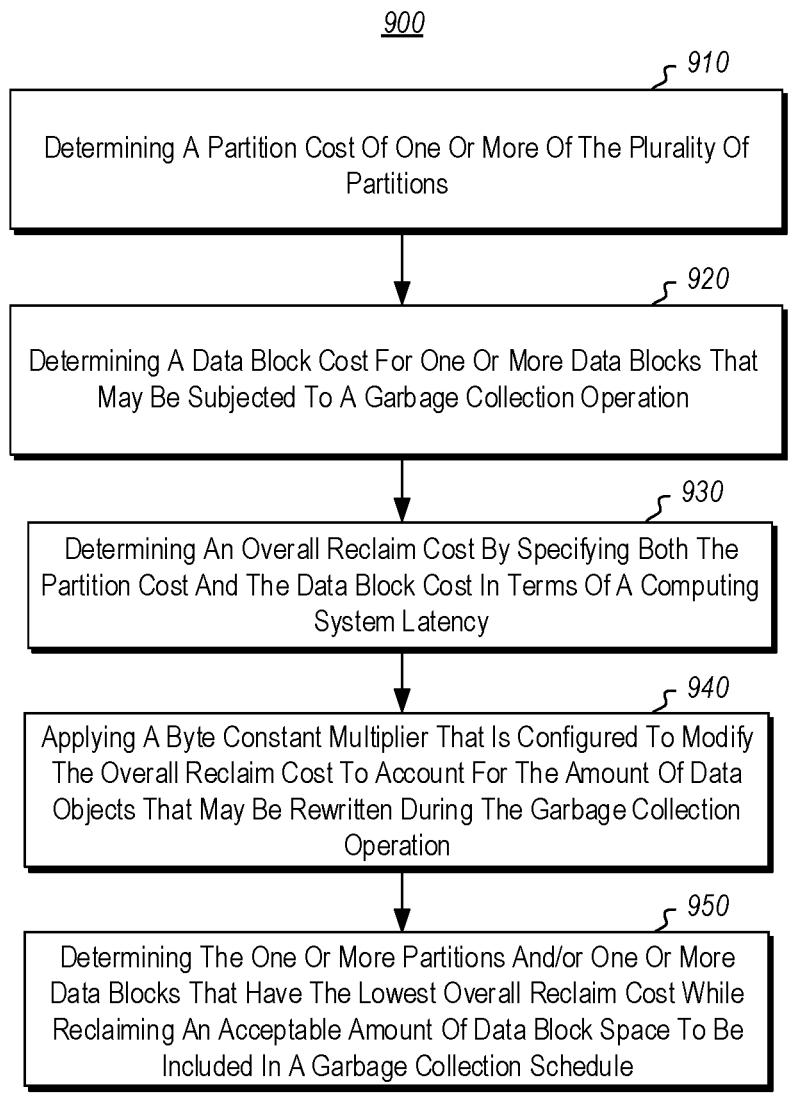
FIG. 9 illustrates a flowchart of a method for scheduling garbage collection in a distributed environment that includes a plurality of partitions that reference a plurality of data blocks that store data objects, the garbage collection scheduling being based on a cost to reclaim one or more of the data blocks for further use.

FIG. 9 illustrates a flow chart of an example method 900 for scheduling garbage collection in a distributed environment that includes a plurality of partitions that reference a plurality of data blocks that store data objects, the garbage collection scheduling being based on a cost to reclaim one or more of the data blocks for further use. The method 900 will be described with respect to one or more of FIGS. 2-7 discussed previously.

The method 900 includes determining a partition cost of one or more of the plurality of partitions (act 910) and determining a data block cost for one or more data blocks that may be subjected to a garbage collection operation (act 920). For example, as previously discussed the cost evaluation module 250 may determine a partition cost such as partition cost 511 and a data block cost such as data block cost 521.

The method 900 includes determining an overall reclaim cost by specifying both the partition cost and the data block cost in terms of a computing system latency (act 930). For example as previously described the partition cost and the data block cost may specified in terms of latency according to equation 1. The partition cost and the data block may then used to determine the reclaim cost 261 in the manner previously described.

The method 900 includes applying a byte constant multiplier that is configured to modify the overall reclaim cost to account for the amount of data objects that may be rewritten during the garbage collection operation (act 940). For example, as previously discussed the cost evaluation module 250 may determine a BCM value such as BCM value 530. The BCM value may be used to modify the reclaim cost 261 according to equation 2 to account of the amount of data that may be rewritten during garbage collection.

The method 900 includes determining the one or more partitions and/or one or more data blocks that have the lowest overall reclaim cost while reclaiming an acceptable amount of data block space to be included in a garbage collection schedule (act 950). For example, as previously described, particularly in relation to FIG. 7, in one embodiment one or more of the baseline reclaim budget 551, the baseline rewrite budget 552, and the BCM 531 may be varied to determine an effect on a reclaim cost that is based on the baseline budgets and BCM values. The data blocks 251-252 and the partitions 241-243 that minimize the reclaim cost while still providing an acceptable amount of reclaim may be included in the global garbage collection schedule 430.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable storage media having stored thereon computer-executable instructions that are executable by the one or more processors to cause the computer system to schedule garbage collection in a distributed environment that includes a plurality of partitions that point to a plurality of data blocks that store data objects, the garbage collection scheduling being based on a cost to reclaim one or more of the data blocks for further use, the computer-executable instructions including instructions that are executable to cause the computer system to perform at least the following:
   determine a reclaim cost for one or more data blocks of one or more of the plurality of partitions during a garbage collection operation;
   iteratively vary one or more reclaim cost determination factors to determine what effect each of the one or more reclaim cost determination factors have on the reclaim cost; and
   generate a schedule for garbage collection, the schedule including those data blocks that at least partially minimize the reclaim cost based on the iterative varying of the one or more reclaim cost determination factors.

2. The computing system according to claim 1, wherein the one or more reclaim cost determination factors comprise a byte constant multiplier that is configured to modify the reclaim cost to account for the amount of data objects that may be rewritten during the garbage collection operation.

3. The computing system according to claim 1, wherein the one or more reclaim cost determination factors comprise a baseline reclaim budget and a baseline rewrite budget, the baseline reclaim budget specifying an acceptable amount of data blocks that should be reclaimed by the garbage collection operation and the baseline rewrite budget specifying an upper limit on the amount of data objects that may be rewritten during the garbage collection operation.

4. The computing system according to claim 1, wherein the reclaim cost includes a partition cost that specifies a cost of a number of IOs needed to read metadata related to an occupancy of data objects on data blocks.

5. The computing system according to claim 1, wherein the reclaim cost includes a data block cost that specifies a cost for rewriting the data objects stored on a first data block to a second data block.

6. The computing system according to claim 1, wherein the reclaim cost includes a partition cost that specifies a cost of a number of IOs needed to read metadata related to an occupancy of data objects on data blocks and a data block cost that specifies a cost for rewriting the data objects stored on a first data block to a second data block, wherein the partition cost and the data block cost are specified in terms of a latency and wherein data block cost is multiplied by the byte constant multiplier.

7. The computing system according to claim 1, further comprising:
   amortizing at least a portion of the reclaim cost.

8. The computing system according to claim 1, further comprising:
   modifying at least a portion of the reclaim cost to account for one or more data blocks that are shared by two or more partitions.

9. The computing system according to claim 1, wherein the reclaim cost is determined based on historical data.

10. A method for scheduling garbage collection in a distributed environment that includes a plurality of partitions that reference a plurality of data blocks that store data objects, the garbage collection scheduling being based on a cost to reclaim one or more of the data blocks for further use, the method comprising:
    an act of determining a reclaim cost for one or more data blocks of one or more of the plurality of partitions during a garbage collection operation;
    an act of iteratively varying one or more reclaim cost determination factors to determine what effect each of the one or more reclaim cost determination factors have on the reclaim cost; and
    an act of generating a schedule for garbage collection, the schedule including those data blocks that at least partially minimize the reclaim cost based on the iterative varying of the one or more reclaim cost determination factors.

11. The method according to claim 10, wherein the one or more reclaim cost determination factors comprise a byte constant multiplier that is configured to modify the reclaim cost to account for the amount of data objects that may be rewritten during the garbage collection operation.

12. The method according to claim 10, wherein the one or more reclaim cost determination factors comprise a baseline reclaim budget and a baseline rewrite budget, the baseline reclaim budget specifying an acceptable amount of data blocks that should be reclaimed by the garbage collection operation and the baseline rewrite budget specifying an upper limit on the amount of data objects that may be rewritten during the garbage collection operation.

13. The method according to claim 10, wherein the reclaim cost includes a partition cost that specifies a cost of a number of IOs needed to read metadata related to an occupancy of data objects on data blocks.

14. The method according to claim 10, wherein the reclaim cost includes a data block cost that specifies a cost for rewriting the data objects stored on a first data block to a second data block.

15. The method according to claim 10, wherein the reclaim cost includes a partition cost that specifies a cost of a number of IOs needed to read metadata related to an occupancy of data objects on data blocks and a data block cost that specifies a cost for rewriting the data objects stored on a first data block to a second data block, wherein the partition cost and the data block cost are specified in terms of a latency and wherein data block cost is multiplied by the byte constant multiplier.

16. The method according to claim 10, further comprising:
    amortizing at least a portion of the reclaim cost.

17. The method according to claim 10, further comprising:
    modifying at least a portion of the reclaim cost to account for one or more data blocks that are shared by two or more partitions.

18. The method according to claim 10, wherein the reclaim cost is determined based on historical data.

19. A computer program product comprising one or more computer-readable storage media having stored thereon computer-executable instructions that are structured such that, when executed by the one or more processors, cause the computing system to perform scheduling garbage collection in a distributed environment that includes a plurality of partitions that reference a plurality of data blocks that store data objects, the garbage collection scheduling being based on a cost to reclaim one or more of the data blocks for further use, the scheduling comprising:
    determining a reclaim cost for one or more data blocks of one or more of the plurality of partitions during a garbage collection operation;
    iteratively varying one or more reclaim cost determination factors to determine what effect each of the one or more reclaim cost determination factors have on the reclaim cost; and
    generating a schedule for garbage collection, the schedule including those data blocks that at least partially minimize the reclaim cost based on the iterative varying of the one or more reclaim cost determination factors.

20. The computer program product of claim 19, wherein the one or more reclaim cost determination factors comprise a byte constant multiplier that is configured to modify the reclaim cost to account for the amount of data objects that may be rewritten during the garbage collection operation, a baseline reclaim budget that specifies an acceptable amount of data blocks that should be reclaimed by the garbage collection operation, and a baseline rewrite budget that specifies an upper limit on the amount of data objects that may be rewritten during the garbage collection operation.

* * * * *